United States Patent [19]

Nicoud et al.

[11] Patent Number: 5,422,007
[45] Date of Patent: Jun. 6, 1995

[54] METHOD AND APPARATUS FOR FRACTIONATION OF A MIXTURE ON A SIMULATED FLUIDIZED BED IN THE PRESENCE OF A COMPRESSED GAS, A SUPERCRITICAL FLUID OR A SUBCRITICAL LIQUID

[75] Inventors: Roger Nicoud, Richardmesnil; Michel Perrut, Villeurbanne; Gerard Hotier, Rueil Malmaison, all of France

[73] Assignee: Institut Francais du Petrole & Separex, Rueil Malmaison, France

[21] Appl. No.: 170,248

[22] PCT Filed: Apr. 28, 1993

[86] PCT No.: PCT/FR93/00419

§ 371 Date: Dec. 27, 1993

§ 102(e) Date: Dec. 27, 1993

[87] PCT Pub. No.: WO93/22022

PCT Pub. Date: Nov. 11, 1993

[30] Foreign Application Priority Data

Apr. 29, 1992 [FR] France .................. 92 05304
Jul. 30, 1992 [FR] France .................. 92 09444
Apr. 21, 1993 [FR] France .................. 93 04703

[51] Int. Cl.⁶ ............................................ B01D 15/08
[52] U.S. Cl. ................................ 210/659; 210/198.2
[58] Field of Search ............... 210/635, 656, 659, 672, 210/198.2; 95/82, 86; 96/101, 104

[56] References Cited

U.S. PATENT DOCUMENTS

| | | | |
|---|---|---|---|
| 3,761,533 | 9/1973 | Otani et al. | 260/674 SA |
| 4,402,832 | 9/1983 | Gerhold | 210/659 |
| 4,498,991 | 2/1985 | Oroskar | 210/659 |
| 4,500,432 | 2/1985 | Poole | 210/198.2 |
| 4,970,002 | 11/1990 | Ando | 210/659 |
| 4,990,259 | 2/1991 | Kearney | 210/659 |
| 5,064,539 | 11/1991 | Tanimura | 210/659 |
| 5,093,004 | 3/1992 | Hotier | 210/659 |
| 5,102,553 | 4/1992 | Kearney | 210/659 |
| 5,114,590 | 5/1992 | Hotier | 210/659 |
| 5,122,275 | 6/1992 | Rasche | 210/659 |
| 5,156,736 | 10/1992 | Schoenrock | 210/659 |
| 5,180,487 | 1/1993 | Saito | 210/198.2 |

FOREIGN PATENT DOCUMENTS

| | | | |
|---|---|---|---|
| 0127926 | 12/1984 | European Pat. Off. | 210/198.2 |
| 0415822 | 3/1991 | European Pat. Off. | 210/198.2 |
| 2527934 | 12/1983 | France | 210/198.2 |
| 4041414 | 6/1991 | Germany | 210/198.2 |

*Primary Examiner*—Ernest G. Therkorn
*Attorney, Agent, or Firm*—Millen, White, Zelano & Branigan

[57] ABSTRACT

An apparatus and process for fractionation of component mixtures by chromatography or adsorption on a simulated mobile bed comprising three, four or five zones is described. A compressed gas is injected as eluent (IE, IR) using a compressor or pump, the pressure being lower than the critical pressure of the gas. At any point in at least one zone and preferably at any point in at least two zones from the eluent injection point (IR), the gas has a compressibility coefficient substantially different to 1. A supercritical fluid or a subcritical liquid may equally be injected as the eluent. The pressure between each zone may be altered.

32 Claims, 2 Drawing Sheets

METHOD AND APPARATUS FOR FRACTIONATION OF A MIXTURE ON A SIMULATED FLUIDIZED BED IN THE PRESENCE OF A COMPRESSED GAS, A SUPERCRITICAL FLUID OR A SUBCRITICAL LIQUID

The present invention concerns an apparatus and an industrial process for fractionation of component mixtures, preferably liquids, but also solids or gases, the eluent being either at a supercritical pressure, that is a fluid in a supercritical state or a subcritical liquid, or in the gaseous state in the form of a compressed gas.

It must be remembered that chromatography is based on the following principle: a fluid mixture whose components need to be separated is passed through a generally cylindrical container, the column, which contains a packing of a fluid-permeable porous solid, the stationary phase. The packing is constituted, for example, by a gel or aggregate of powdered particles; the fluid crossing it is constituted either by the fluid mixture whose constituents need to be separated, or by a mixture dissolved in a fluid solvent, the eluent. The rate of passage of the different constituents through the permeable solid depends on the physico-chemical characteristics of the different constituents, resulting in the constituents leaving the column successively and selectively. Certain constituents tend to be strongly retained by the solid mass and are thus more retarded, others are only slightly retarded and pass through rapidly with the eluent.

Materials occur in three states: solid, liquid and gas. Temperature and/or pressure can be varied to pass from one state to another. There is a point beyond which a material can pass from the liquid to the gaseous or vapour state without boiling, or vice versa by condensing, in continuous fashion: this point is known as the critical point.

It is known that a fluid in a supercritical state, that is a state characterised either by a pressure and temperature respectively greater than the critical temperature and pressure in the case of a pure material, or by a representative point (pressure, temperature) situated above the envelope of critical points on a (pressure, temperature) graph in the case of a mixture, produces a far higher solvating power in many substances compared to that observed in the same fluid as a compressed gas; similarly for subcritical liquids, that is in a state characterised either by a pressure above the critical pressure and by a temperature lower than the critical temperature in the case of a pure material, or by a pressure above the critical pressures and a temperature lower than the critical temperatures of the components in the case of a mixture.

Large and modifiable variations in solvating power are exploited in numerous processes for removal (solid/fluid), fractionation (liquid/fluid), analytical or preparative chromatography, material production (ceramics, polymers . . . ); chemical or biochemical reactions are also carried out in such solvents.

One of the main advantages of processes employing fluids at supercritical pressures resides in the ease of separation of solvent (the fluid) from the extracts and solutes, as described in numerous publications and, for certain important aspects of carrying out the processes, in French patent FR-A-2 584 618.

Interesting properties of these fluids have long been used in elution chromatography, either in analysis or for industrial production in accordance with a process described in French patent FR-A-2 527 934. These fluids have also been used as desorption solvents for compounds retained on absorbants, as described in several United States patents (U.S. Pat. Nos. 4,061,551, 4,124,528, 4,147,624).

Numerous studies of elution chromatography using supercritical fluids or subcritical liquids have shown a surprising behaviour in these fluids, in particular the large dependence of the retention factor (and thus retention time) on the bulk density and temperature of the eluent fluid. This property will be widely exploited in the apparatus and process described in the present invention. In addition, whilst perfect gases (that is primarily gases at low pressures and temperatures much higher than their boiling point at the pressure under consideration) have a retention factor which is independent of pressure at constant temperature, this large variation in retention factor as a function of bulk density and thus of pressure if the temperature is maintained constant, is not only observed for fluids at a pressure greater than the critical pressure but also for compressed gases, that is gases at a pressure below the critical pressure but above a pressure where they behave as perfect gases.

This property will be exploited in the apparatus and process described in the present invention which not only uses an eluent at supercritical pressure but also uses a gaseous eluent at a pressure high enough for this particular behaviour to appear in chromatography. This is described by a number of authors in the particular case of analytical elution chromatography, for example G. M. Schneider, Angew Chem Int Ed Engl 17, (1978), p 716–727; C. R. Yonker and R. D. Smith, J of Chromatography 351 (1986), p 211–218 and 396 (1986) p 19–29; M. Perrut and J. Dellacherie, Proc of the 1st symp on supercritical fluids Nice 1988; proceedings 2-905-267-13-5, p 439–445.

The present invention aims to provide fractionation, on an industrial production scale, of mixtures into different fractions using a complex chromatographic system generally derived from processes termed in the art as simulated mobile bed chromatography which has been widely used on the large scale for several decades and described in several United States patents, for example U.S. Pat. Nos. 2,985,889, 3,696,107, 3,706,812, 3,761,533, 4,402,832, and in several French patents, FR-A-2 103 302, FR-A-2 651 148 and FR-A-2 651 149.

The invention is based on the fact that, rather than as in the above processes using liquid eluents whose retention properties are independent of the pressure used, the eluent is a supercritical fluid, a subcritical liquid or a compressed gas whose physico-chemical properties, such as that described above relating to retention factor, result in a very different operation to that conventionally used with liquid eluents, that is with gaseous eluents behaving much as a perfect gas. This gives surprising results which will be described below and which are very different to those obtained with liquid eluents. When working with liquid eluents it is very difficult to alter their eluting power apart from changing the composition, as for example systems using a composition gradient generally in use in liquid phase chromatography. This produces difficult solvent recycling problems and leads to very high manufacturing costs when such processes are carried out on an industrial scale. It is also difficult to vary the temperature bearing in mind the requirement for complete homogeneity of temperature in all sections of a chromatographic column—rendering this almost impossible on an industrial scale.

Figure 1:
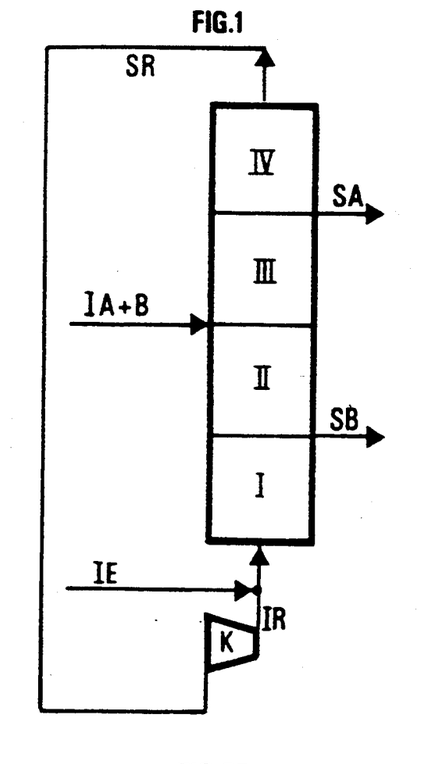
FIG. 1 shows an assembly for separation of a mixture of two constituents.

FIG. 1 illustrates the function of conventional simulated counter-current chromatographic processes. The apparatus comprises a certain number n (conventionally 4 to 24) of chromatographic columns or column sections ($C_k$) constituted by cylinders filled with a packing of a porous medium, the stationary phase. The n columns ($C_k$), maintained at the same temperature, are connected to each other in series and are percolated by liquid eluent E circulated in the direction of the arrow by a pump P (or compressor K) at a carefully selected flowrate and disposed between any two columns or sections; introduction of the mixture to be separated IA+B and addition of eluent E, and extracting a raffinate mixture SA and an extract SB are effected between certain columns ($C_k$) and ($C_{k+1}$), the assembly of columns being for example separated into four zones; It has been shown, and used on a very large scale in several dozen industrial units, that if the circulation flowrate of the eluent delivered by pump P or compressor K and the rates of introduction and removal are properly selected and if the four introduction/removal points delimiting said four zones are displaced from the interval between columns ($C_k$) and ($C_{k+1}$) to the interval between columns ($C_{k+1}$) and ($C_{k+2}$) at regular time intervals t, the mixture to be separated is fractionated into two fractions, raffinate and extract, with greater selectivity, provided the stationary phase and elution solvent have been carefully selected. The advantages of this type of operation are considerable compared with conventional chromatographic frontal or elution processes:
- the system is operated continuously rater than discontinuously, which latter is difficult to control;
- raffinate and extract component dilution is much lower; in certain favourable cases, the components are at the same concentration as in the starting mixture, that is much more concentrated than would be the case of conventional elution or frontal processes where a dilution of 100 or 1000 is normal, resulting in very high costs for manipulation of eluent and separation of eluent and products;
- the number of theoretical plates required for a given operation is much lower than those for the conventional techniques mentioned above, thus greatly reducing both the cost of the stationary phase required and the equipment which conventionally operates at low or medium pressure ($\leq 30$ bar; 1 bar $= 10^{-1}$ MPa).

This type of process has thus proved extremely economical for treatment of very large tonnages of products at low cost, such as purification of paraxylene or fractionation of glucose/fructose.

The eluent circulation pump P remains in a fixed position between two columns; since liquids are not compressible, their eluting power is independent of pressure and thus remains constant with time in all zones, whatever the position of the pump in each of these zones. It should also be noted that the number of columns in the different zones generally differs.

More complex versions of this basic concept propose not two but three (or more) fractions extracted at certain points situated between two columns ($C_k$) and ($C_{k+1}$), these points and those for introduction and addition of eluent and mixture to be separated being displaced at regular intervals as described above.

The present invention provides a fractionation apparatus for a mixture of p components into p components or q cuts, q being less than or equal to p, the apparatus comprising an assembly of n chromatographic columns or column sections mounted in series in a closed loop, having at least r injection streams and at most n injection points per injection stream and having q removal streams and at most n removal points per removal stream, the injection and removal points of different streams being advantageously identical, the injection and removal streams being alternated along the series of columns or sections, r, n, p and q being whole numbers defined as follows:

p: represents the number of components present in the batch, $p \geq 2$;

q: represents the number of distinct cuts or effluents issuing from the process, $q \geq 2$, and preferably $q \leq 5$;

n: represents the number of distinct columns or column sections used: $n \geq 3$ and preferably $n \leq 24$;

r: represents the number of distinct injection streams in the system, $5 \geq r \geq 2$ and preferably $q \geq r \geq 2$;

the closed loop being formed of m successive chromatographic zones, such as (I, II, III; I, II, III, IV; O, I, II, III, IV; I, Z, II, III, IV; I, II, III, Z, IV), each of these zones being constituted by at least one column or section ($C_k$);

m: represents the number of zones: $3 \leq m \leq q + r$, at least one and at most two points ($IR_1$, $IR_2$) between two zones serving for injection of eluent (recycled, fresh or recycled plus additional fresh), at least one point between two zones (IA+B or IA+B+C) serving for injection of the mixture to be fractionated, at least one raffinate removal point (SA) between each mixture injection point and the following eluent injection point situated downstream of the mixture injection point, with respect to the eluent circulation direction, at least one extract removal point (SB, SC) between each eluent injection point and the mixture injection point situated downstream, with respect to the eluent circulation direction, a removal point (SR) for a recycling stream connected to zone IV, a control apparatus for periodically displacing the injection points ($IR_1$, $IR_2$, IA+B or IA+B+C) and the removal points (SC, SB, SA, SR) of at least one section or column in the same direction (upstream or downstream), the apparatus being characterised in that it comprises a compressor or pump whose takeoff is connected to the recycling stream removal point (SR) and if necessary to an addition point for fresh eluent and whose delivery is connected to at least one recycling stream injection point ($IR_1$ or $IR_2$) upstream of the furthest upstream extract removal point (SC, SB), the compresser or pump being adapted to deliver to said recycling stream injection point either a compressed gas whose pressure is lower than the critical pressure of said gas and which has a compressibility coefficient substantially different to 1, or a supercritical fluid, or a subcritical liquid.

A further object of the present invention is to provide a process for chromatographic fractionation of component mixtures in a closed loop of columns or column sections mounted in series, the eluent being injected at at least one point and the mixture being injected at at least one point, at least one extract being extracted from at least one point situated between an eluent injection point and a downstream component mixture injection point, at least one raffinate being extracted at at least one point between a component mixture injection point and a downstream eluent injection point, said injection and removal points being periodically displaced in the same direction (upstream or downstream) with respect to the packing. More precisely, the process is characterised in that:

either a subcritical liquid is injected as eluent, or a supercritical fluid is injected as eluent, or a compressed gas is injected as eluent, whose pressure at any point in all zones is lower than the critical pressure of the gas and in that at any point of at least one zone and preferably at any point of at least two zones from the eluent injection point, the gas has a compressibility coefficient substantially different to 1.

Selection criteria for the gaseous eluent may appear to be contradictory. They include the following:

the difference in volatility between batch substances and eluent, ability of the eluent to displace the batch constituents (where the eluent is adsorbed), compatibility of eluent and adsorbant: for example water vapour in zeolites or oxygen in active carbon can be avoided under certain temperature and pressure conditions.

Perfect gases (that is mainly gases at low pressures and at temperatures much higher than their boiling point at that pressure, or having compressibility coefficients (defined as PV/RT) of between about 0.95 and 1.05, preferably between 0.98 and 1.02), have a retention factor which is independent of pressure at constant temperature. However, with fluids at a pressure greater than the critical pressure and with compressed gases, (that is gases at a pressure which is lower than the critical pressure but higher than the pressure at which they behave as a perfect gas), a large variation in retention factor is observed as a function of bulk density (and thus of pressure if the temperature is held constant). The pressure is therefore selected to ensure that the coefficient of compressibility is substantially different to 1.

In accordance with a particular embodiment of the invention, the eluent may be injected into the closed loop at a temperature which is different to the operating temperature. Under certain circumstances it may cool down or heat up on contact, for example, with the adsorbant.

According to a further embodiment of the process, by using at least one pressure reduction or release means connected to the apparatus for periodic displacement, the pressure in one column or column section can be kept higher than or substantially equal to that in the section or column immediately downstream except at each eluent injection point where the pressure increases to the injection pressure. Advantageously, the pressure may decrease by at least one interval (defined by two pressure levels) between two removal points following upstream injection of eluent up to the recycling removal point. Preferably, the pressure decreases in each zone. For example, when an apparatus is adapted for separation of three components with four zones O, I, II, III, or five zone O, I, II, III and IV, the pressure may decrease by at least one interval between two removal points other than the extract removal point SC between zones O and I and preferably at least one additional pressure reduction or release means may be added between zone O and zone I, to decrease the pressure between each zone.

According to an advantageous embodiment of the process, the pressure in zone III, upstream of which a mixture AB or ABC has been injected, may be adjusted to a lower value of at least 1 bar and preferably 3 to 100 bar, up to the pressure in zone II.

According to a further embodiment, the most downstream zone (zone IV) can be removed and all the eluent or raffinate downstream of a zone upstream of which the mixture to be separated has been injected can be released and separated by appropriate means (for example, a release valve, followed if necessary by refrigeration or reheating or a distillation column). The raffinate is recovered and the eluent recycling stream is recycled at the injection pressure in zone O using a compressor or pump.

When a mixture of two components is to be separated in the apparatus in accordance with the invention, in accordance with a first embodiment of the process it is possible to completely release and separate all the eluent and raffinate downstream of a zone III upstream of which the mixture AB has been injected using appropriate means (release valve, for example, followed if necessary by refrigeration or reheating or a distillation column). The raffinate is collected and the eluent recycling stream is recycled at the injection pressure in zone 1 using a compressor or pump. This variation has the advantage of removing the need for the fourth and final zone.

According to a second embodiment of the process for separating a mixture of two components, a portion of substantially eluent free extract may be introduced downstream of a zone Z between zone I and zone II, defined upstream by the extract removal point (SB) and downstream by a reinjection point (IRB) for the portion of substantially eluent free extract B.

According to a third embodiment of the process for separating a mixture of two components, a portion of substantially eluent free raffinate may be introduced upstream of a zone Z situates downstream of zone III, defined upstream by a reinjection point for said portion of substantially eluent free raffinate, and downstream by the raffinate removal point (SA).

In these two variations, the injection pressure (IRB or IRA) will be such that the zone downstream of the injection point will be at most equal to the pressure in the zone immediately upstream.

For simplification purposes, the following will be limited to the case where p and q are equal to 2, that is correspond to a mixture of two components to be separated in two cuts, giving a circuit with n eluent injection points, n mixture injection points, (ie at most 2n injection points in total), n extract removal points, n raffinate removal points (ie, at most 2n removal points in total); advantageously these 4n injection and removal points are combined in n points. This results in a circuit comprising successively and in series an ekuent injection stream, an extract removal stream, an injection stream for the mixture to be fractionated, and a raffinate removal stream, each of these streams being alternately connected to n injection-removal points located between two successive columns.

One or more columns or column sections in series may be provided between two successive injection or removal points. For ease of comprehension, in the following the columns will be considered to be successive and spaced from one another, mounted in series and having the same dimensions. Clearly, it is possible to consider each zone as being defined not by an individual column but by one or more section(s) in a longer column which, in the limiting case, produces a single column with an eluent circulation circuit between the two column extremities. Use of a number of columns, however, even when divided into sections, eases operation and filling with the packing as well as its removal and renewal at the end of the operation.

The terms and principles used can be more easily illustrated by referring to FIG. 1 which depicts the operating principle of an apparatus of the present invention corresponding to a simulated counter-current mobile bed using a vertical chromatographic column divided into sections, in this case four positioned one above the other and corresponding respectively to zone I, zone II, zone III and zone IV starting from the column base. Eluent is introduced by compressor K into the lower part of the column at IE and the mixture of components A and B is introduced between zones II and III at IA+B. Components A and B are extracted as an extract containing essentially component B at SB between zone I and zone II and in the form of a raffinate containing essentially component A at SA between zone III and zone IV. In FIG. 1, the eluent circulates from bottom to top. As will be described below, a relative shift with respect to the solid phase of the injection and removal points will be effected which will simulate a downward shift of the solid phase. It should be noted here that it is better not to displace the solid packing phase upstream relative to the injection and removal points but hold the fixed solid packing in position and displace the injection and removal points relative thereto by shifting them periodically from one zone in the same direction as the eluent circulates, ie, downstream. Returning to FIG. 1, the fluids circulate from bottom to top, mixture A+B is injected between zone II and zone III, ie, at mid height and the components separate chromatographically due to interaction between the components and the stationary phase in the solid packing, for example by adsorption. Components with stronger affinity with the solid phase are thus more difficult for the eluent to take up and exit later, while components with weaker affinity tend to be taken up more easily and thus exit earlier. If the component with weaker affinity, in this case A, is required to exit the column between zone III and zone IV and if the component with stronger affinity, in this case B, is required to exit the column between zone I and zone II, the following operating conditions are preferable:

In zone I, strong elution must be encouraged, that is high eluent flowrate and/or solvating power to prevent B exiting at the bottom while the packing shifts downwards. This allows component B, with the stronger affinity, to be extracted between zone I and zone II.

In zone II, component A, with weaker affinity, must rise by following the eluent so that it does not exit at the bottom with B. B must remain fixed on the solid so that it can than descend from zone II to zone I towards the exit with the subsequent zone shift of the chromatographic packing. This requires weak elution and thus a lower eluent flowrate and/or solvating power in zone II than in zone I.

In zone III, component A, with weaker affinity, must be entrained by the eluent in order to be extracted at A between zone III and zone IV, while component B must remain fixed on the solid and descend from zone III towards zone II during shifting. This necessitates weak elution and thus the eluent flowrate and/or solvating power must not be greater in zone III than in zone II, ie, it must be equal or less.

In zone IV, component A must not be entrained by the recycling eluent, and thus elution and therefore the eluent flowrate and/or solvating power must be lower than that in zone III.

For simplification, it can be considered that, from each zone to the next, it is preferable for the eluting or solvating power to diminish or remain the same and should not increase, except of course at the exit to zone IV for recycling into zone I, with respect to the eluent, and in the opposite sense regarding the solid. The following case is limited to two constituents, but as emphasised above it may be extended to more than two constituents by increasing the number of removal points downstream or upstream with respect to the injection point for mixture A+B.

BRIEF DESCRIPTION OF THE DRAWINGS

The technical features and advantages of the present invention will be better understood from the following description of non-limiting embodiments. FIG. 1 will be referred to, along with the following figures:

DESCRIPTION OF THE PREFERRED EMBODIMENTS

Figure 5:
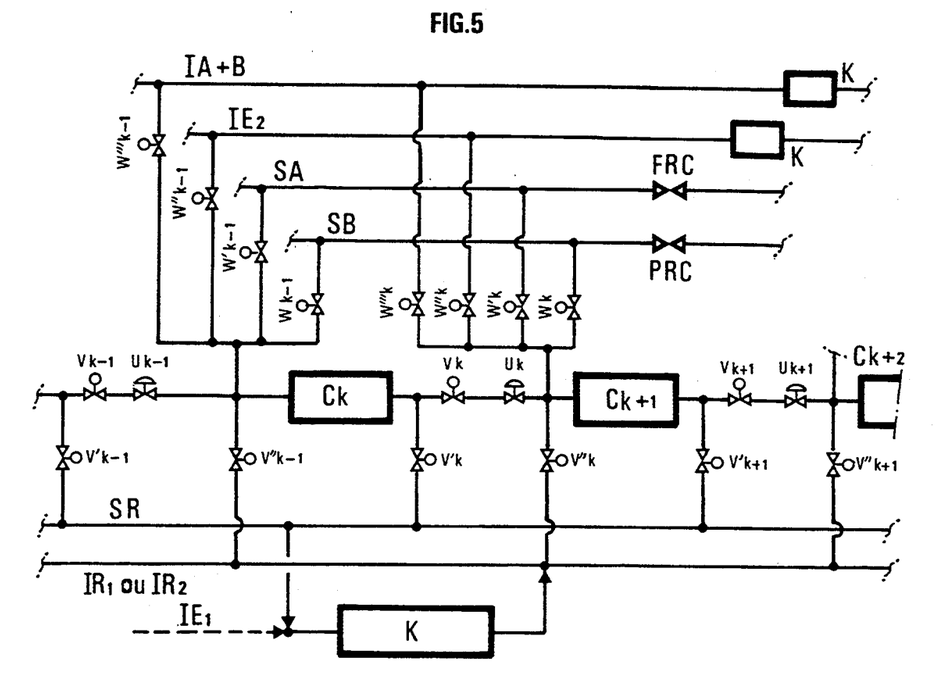
FIG. 5 illustrates a portion of an apparatus in accordance with the invention.

An operating portion of an apparatus of the present invention is represented in FIG. 5. This apparatus comprises a certain number (preferably 3 to 24) of chromatographic columns constituted by sections or cylinders filled with a packing of a porous medium, the stationary phase. Said columns ($C_k$), whose walls are thermally insulated are connected to each other in series and percolated by an eluent (compressed gas, supercritical fluid or subcritical liquid) circulated by compressor K or a pump with a mass flowrate carefully maintained at a constant value; introduction of fractionating mixture and addition of eluent along with removal of a raffinate mixture and an extract mixture is effected between certain of the columns ($C_k$ and $C_{k+1}$), as seen in FIG. 1. The assembly of these columns is, for example, separated into four zones.

The process is operated so that the eluting power of the eluting fluid can be maintained at a substantially constant value in each of the zones, but it may also be different from one zone to another, in contrast to the processes described above using a liquid eluent.

This is possible because of the particular properties of supercritical fluids or subcritical liquids or compressed gases mentioned above, providing that equipment can be designed which is adapted to utilise such a variation. As mentioned above, it is very difficult to modify the temperature of granular beds in large scale installations and it is therefore not easy to modify the eluting power simply by varying the pressure of the eluent, something which is relatively easy over certain pressure/temperature ranges. One of the particular embodiments of the invention consists in maintaining substantially the same pressure and eluting power in all the columns except for pressure drops.

For technical considerations concerning the requirement to minimise dead volumes in any chromatographic fractionating installation (except perhaps at the junction of the first and last zones), it is not preferable to modify the eluting power by varying the pressure at constant temperature (isothermal conditions), but rather to vary the pressure at constant enthalpy (adiabatic or isenthalpic conditions); this necessitates selection of operational parameters which lie in a zone of the pressure-temperature diagram for the eluent fluid where variations in temperature are small (several degrees Kelvin) during pressure modification between the zones. This is not a big limitation on the operation of the process of the present invention; a heat exchanger can be inserted without any problem between the last and first zone in the process.

Theoretical considerations and experimental confirmation (presented below in the non-limiting examples of operation of a process in accordance with the invention) lead to the belief that the eluting power in each of the four zones defined for FIG. 1 preferably decreases, implying that the pressure in each zone also preferably decreases, without excluding the possibility that they may be substantially equal in two or three successive and even all four zones.

This implies that compressor K and the depressurising means ensuring a pressure fall between each pair of zones must remain fixed with respect to the zones. Fractionation preferably requires regular displacement of the introduction points for addition of eluent and mixture to be separated and the removal points for raffinate and extract at fixed time intervals t, said points delimiting the four zones defined above to change the intervals between the sections or columns ($C_k$) and ($C_{k+1}$) to intervals between sections or columns ($C_{k+1}$) and ($C_{k+2}$), these four zones thus displacing at rate t in the direction of eluent flow (simulated counter-current) or in the opposite direction (simulated co-current).

The system represented in FIG. 5 may advantageously be used to carry out the process. In this embodiment, it is necessary to carry out the following:
- alter the position of the compressor or pump (K) so that the maximum pressure is always at the head of zone 1; this can be effected by a system of connections and automatic on-off valves between each column as shown in FIG. 5;
- change the location of points where pressure is reduced by creating a controlled pressure drop at the end of zones I, II and III by controlling the regulating valves located between each of the columns, as shown in FIG. 5.

Each column $C_k$ is connected to the next $C_{+1}$ via an on-off valve $V_k$ then a pressure regulating valve $U_k$. Eluent at the exit of column $C_k$ and that from recycling removal point SR, together with added fresh eluent IE if required, is recompressed in compressor K or the pump via on-off valves $V'_k$ and $V''_k$ respectively connected to the removal line SR and recycling solvent injection line IR, valves $V_k$ and $U_k$ thus being closed.

It is thus possible to displace the starting point of zone I, which requires the highest pressure and position the compressor by closing $V_k$ and opening $V'_k$ and $V''_k$, all other valves V apart from $V_k$ being open and all valves V' and V'' apart from $V'_k$ and $V''_k$ being closed; at the same time the ends of zones I, II and III, where the eluent must be depressurised by $\Delta P1$, $\Delta P2$, $\Delta P3$ respectively by operating corresponding release valves U, can be displaced. Remaining valves U are fully open.

The extract removal line SB is connected to a pressure regulating valve in order to control the pressure in column section $C_k$. It is connected downstream of valve $U_k$ and upstream of column $C_{K+1}$ via valve $W_k$. This valve $W_k$ controls extract removal (SB) and opens once per cycle. At that moment, valves $V_k$ and $U_k$ are open, valves $W_1$ to $W_{k-1}$ and $W_{k+1}$ to $W_n$, also valves $W'_k$, $W''_k$ and $W'''_k$, are closed.

Raffinate removal line SA is connected to a flow regulation valve to extract at a constant flowrate and is connected downstream of valve $U_k$ and upstream of column $C_{k+1}$ via valve $W'_k$. This valve $W'_k$ controls removal of raffinate SA and opens once per cycle. At that moment, valves $V_k$ and $U_k$ are open while valves $W'_1$ to $W'_{k-1}$ and $W'_{k+1}$ to $W'_n$, also valves $W'_k$, $W''_k$ and $W'''_k$, are closed.

Lines IA+B and IE2 are each connected to a separate compressor or pump to provide constant flowrates. Line IA+B is connected downstream of valve $U_k$ and upstream of column $C_{k+1}$ via valve $W''''_k$. This valve controls mixture injection and opens once per cycle. At that moment valves $V_k$ and $U_k$ are open, valves $W_k$, $W'_k$ and $W''_k$, also valves $W''''_1$ to $W''''_{k-1}$ and $W''''_{k+1}$ to $W''''_n$ are closed. It should be noted that valve $W'''_k$ controls injection of a lower density solvent IE2 upstream of column $C_{k+1}$. This line is only used when the injected mixture comprises three constituents ABC. In this case, an removal line for extract SC must be added. The extract removal points are distinct and positioned between $C_k$ and $V_k$ and are not shown in FIG. 5. Valves U indicated as open may either be completely open or be partially open to control the pressure difference between $C_k$ and $C_{k+1}$.

When the eluent is a supercritical fluid or a subcritical liquid, the mixture to be separated may be fed either directly without prior dilution if the mixture is liquid at the feed temperature and pressure, or more generally and preferably following dilution of said mixture in the eluent itself, prior or subsequent dilution being carried out under conditions similar to those required in the zone under consideration (zone III in FIG. 1).

The dilution operation is conventionally carried out in accordance with normal practice: as a nonlimiting example, the operation may be carried out by dissolving the solid fractionation mixture using the eluent percolating through a solid bed, the eluent being in a state such that its solvating power is fixed, to produce a saturated solution at the desired concentration of the mixture; similarly, if the mixture is liquid, the eluent can be bubble percolated through the mixture under conditions where it becomes saturated with mixture at the desired composition; if the mixture to be fractionated is gaseous or liquid, dissolution in the eluent may be effected by continuous mixing, the two streams being carefully controlled.

When the eluent is a compressed gas, the batch to be separated may preferably be gaseous or, if necessary, liquid. The liquid batch may if necessary be dissolved in the gaseous eluent.

The mixture to be separated is preferably fed in at a temperature and pressure very close to those in the zone under consideration (zone III); disturbances in the flow region and chromatographic region of the downstream columns are thus minimised. However, in an interesting alternative embodiment of the invention, this infeed can be used to input enthalpy. The most preferred embodiment of the invention consists in carrying out isenthalpic variations in pressure, as described above, through regulating valves ($U_k$); in certain cases this depressurisation may be accompanied by a considerable fall in the fluid temperature which can be compensated by introducing the mixture to be fractionated at a higher temperature than said fluid temperature. Similarly, the fluid compression produced by compressor (K) is generally a source of heat for said fluid; it is possible to counteract this heating by introducing the eluent addition at a lower temperature than that of the fluid issuing from the last upstream column.

These variations improve temperature stabilisation of the fluid treated in the chromatographic column assembly and avoid temperature variations in the columns on changing zones. This latter may adversely affect operation of the process.

The raffinate and extract removed from the process are solutions of fractionated or separated substances, in a certain amount of eluent. Apparatus of the prior art such as that described in the French patent document cited above, FR-A-2 584 618, will separate the eluent from the substances, said eluent being preferably recycled into the process by eluent addition; one of the main advantages of the process resides in the fact that operation is easier in that, in contrast to the problems encountered when the eluent is a conventional liquid solvent, this separation does not require a complex apparatus or high energy consumption; in addition, when the eluent is for example pure carbon dioxide, the fractionated substances are generally not polluted by any trace of residual organic solvent. This constitutes a considerable additional advantage.

Figure 3A:
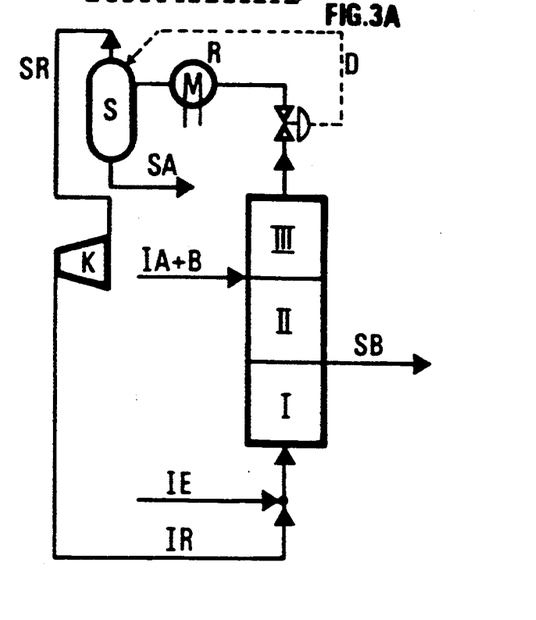
FIGS. 3a, 4a and 4b are further embodiments of an assembly for separation of a mixture of 2 constituents.

FIG. 3A represents a simplified variation of FIG. 1, with the same references as for FIG. 1, and in which zone IV is replaced by depressurisation and separation. When the volatility contrast is sufficient between the eluent, for example a gas, and the batch constituent which is the least adsorbed, it may be advantageous to separate liquid and vapour in a single stage at the exit to zone III. FIG. 3A represents the most usual conditions:

adiabatic depressurisation of the gas by valve D which liquefies a part of the fluid, the raffinate being separated in separation stage S and the eluent vapour being recycled as it is provided that the residual amount of least adsorbed constituent is sufficiently low;

adiabatic depressurisation by valve D followed by additional refrigeration R or reheating, followed by separation S. The raffinate is separated and the eluent recycled by compressor K;

a third possibility not shown in the figure may consist in recompressing the gas followed by depressurisation to the pressure in stage I, followed if necessary by separation.

According to these embodiments, variations in pressure between different zones may be small (pressure drops only), but preferably at least one pressure change between two successive zones may be effected using pressure regulating valves $U_k$ in FIG. 5.

Figure 4A:
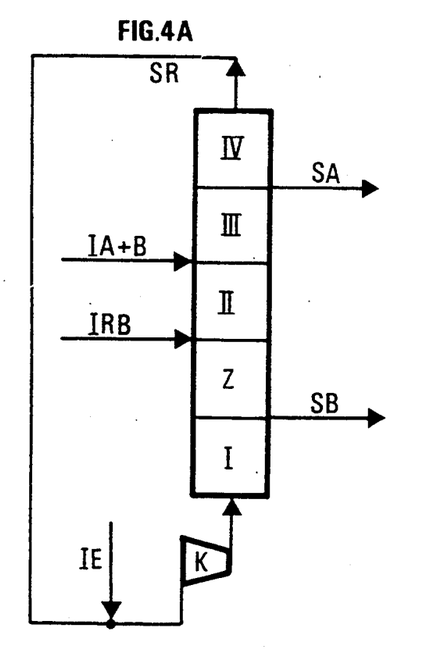
Figure 4B:
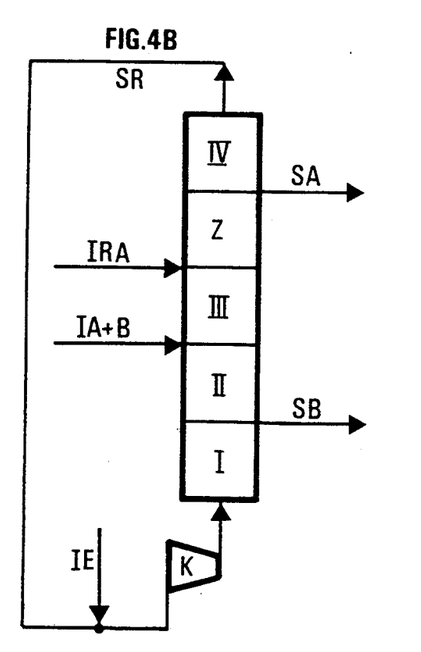

FIGS. 4A and 4B show two improvements to the embodiment described in FIG. 1, using the same references. Zone Z (FIG. 4A) is interposed between zones I and II, defined upstream by the removal point and downstream by the reinjection point for a portion of the substantially eluent free extract.

For practical purposes, circuit IE2 in FIG. 5 is designated for injection of constituent B, fresh eluent IE being supplied simultaneously with the recycling stream SR at the takeoff of compressor K.

In FIG. 4B, zone Z may be interposed between zones III and IV and defined upstream by a reinjection point for a portion of the substantially eluent free raffinate and downstream by the extract removal point. This raffinate portion may then be injected upstream of zone Z.

Figure 2:
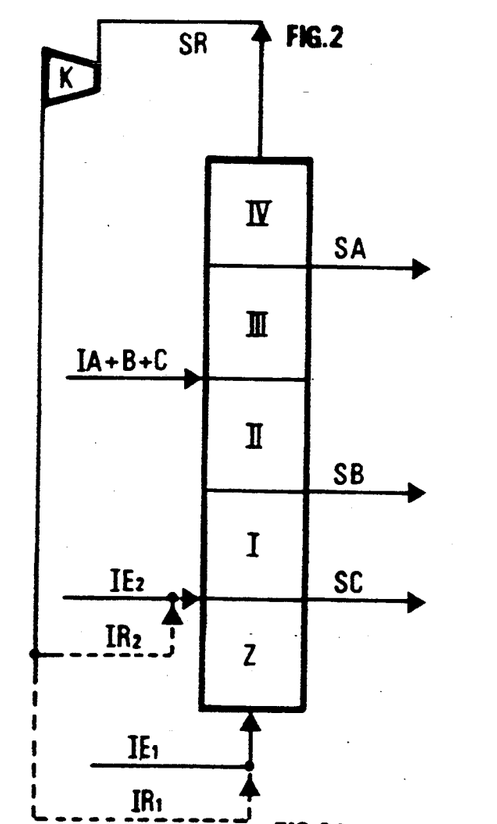
FIGS. 2, 3b show versions of an apparatus for separation of a mixture of 3 components.

Variations in pressure between successive zones in the figures may be small (pressure drops only). Advantageously, at least two and at most four successive pressure levels may be created using at least one and at most three pressure regulating valves ($U_{k-1}$, $U_k$, $U_{k+1}$) shown in FIG. 5. FIG. 2 schematically represents the apparatus adapted for separation of a mixture of three components A, B, C using the following references:

K: pump or compressor
IR1: recycling fluid injection connected to the compressor delivery
IE1: injection of fresh eluent
zone O: desorption of most strongly adsorbed component(s) and retention of other components
SC: removal of most strongly adsorbed component(s) (extract C) downstream of zone O
IR2: injection of recycling fluid if required
IE2: injection of fresh eluent if required upstream of zone I
zone I: desorption of least strongly and averagely adsorbed component(s) and retention of most strongly adsorbed component(s)
SB: removal of averagely adsorbed component(s) downstream of zone I (extract B)
zone II: desorption of least strongly adsorbed component(s) and retention of other components
IA+B+C : component mixture injection upstream of zone III
zone III: desorption of least strongly adsorbed component(s) and adsorption of most strongly adsorbed component(s)
SA: removal of least strongly adsorbed component(s) (raffinate A downstream of zone III)
zone IV: adsorption of least strongly adsorbed component(s)
SR: removal of recycling fluid connected to compressor takeoff.

In this instance, the injection circuits concerning the second recycling point IR2 and injection of fresh eluent at a second point IE2 upstream of zone I described in FIG. 5 are used.

Advantageously, at least two and at most five distinct pressure levels may be changed in the zone assembly, the pressure diminishing at least at each removal and preferably at least two pressure levels are other than those between zone O and I. Under these conditions, at least one and at most four release valves connected on one side to on-off valves and on the other to columns k, k+1, etc. are active and preferably at least one valve is other than that between zone O and I.

Figure 3B:
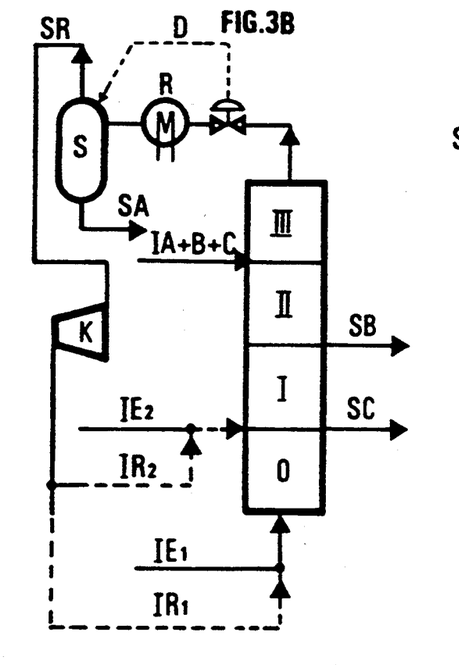

According to a simplified embodiment illustrated in FIG. 3B, zone IV of FIG. 2 can be replaced by directing the mixture issuing from zone III into release valve D, and if necessary into a refrigeration or reheating means R and into a separator. The raffinate is then collected while the separated eluent is recycled by compressor K at the injection pressure upstream of zone O. This embodiment has the same advantages as those described for FIG. 3A. Variations in pressure levels between zones may be small (only pressure drops) but it is preferable that the pressure is varied by at least one pressure interval between two successive removals, the pressure diminishing at least at each removal.

The invention has many applications in fractionating mixtures and separating components in, for example, the chemical, food and pharmaceutical industries as well as in refining and the petrochemical industry.

EXAMPLE 1

Separation of an equimolar mixture of 1-methylnapthalene and 2-methylnapthalene.

The apparatus used was as described with reference to FIG. 1 comprising twelve chromatographic columns or sections which were 30 cm long, 6 cm diameter cylinders filled with a stationary phase constituted by grafted octadecyl silica particles (RP 18) with an average diameter of about 35 μm, connected in series with the system of valves and pressurisation described above.

The eluent was pure carbon dioxide. No heat exchanger was installed in series between the columns. Several types of fractionation using the inventive process were carried out, using the isobaric mode with a substantially constant pressure in the four zones of about 146 bar and a temperature of 40° C., and in two different cases in the mode where eluting power is varied. Functional parameters and fractionation results obtained in the steady state are presented below:

EXAMPLE 1a

Operational parameters and results obtained were as follows:
Substantially constant pressure mode (146 bar), constant temperature (40° C.) and constant bulk density of supercritical eluent (750 kg.m$^{-3}$)
Number of column or sections per zone: 3
Mass flowrate of mixture to be separated: 1.8 kg/h constituted by 0.100 kg/h of a mixture of napthalene derivatives dissolved in 1.7 kg/h of carbon dioxide at 150 bar and 40° C.
Mass flowrate of added eluent constituted by pure carbon dioxide at 150 bar and 40° C.: 3.3 kg/h
Raffinate removal mass flowrate constituted by 0,050 kg/h of napthalene derivatives dissolved in 2.45 kg/h of carbon dioxide: 2.5 kg/h
Extract removal mass flowrate constituted by 0.050 kg/h of napthalene derivatives dissolved in 2.55 kg/h of carbon dioxide: 2.6 kg/h
Mass flowrate from compressor: 37.2 kg/h
Raffinate composition (after separation of $CO_2$): 88% 2-methylnapthalene
Extract composition (after separation of $CO_2$): 89% 1-methylnapthalene
The pressure drop in the 12 columns or sections was very low and so the system was operating in substantially constant pressure mode
The displacement period was 10 minutes.

EXAMPLE 1b

Operational parameters and results obtained were as follows:
Eluting power modulation mode (supercritical eluent)
Zone I: 3 columns or sections Pressure 253 bar Temperature 40° C. Bulk density of eluent 900 kg.m$^{-3}$
Zone II: 3 columns or sections Pressure 146 bar Temperature 37° C. Bulk density of eluent 750 kg.m$^{-3}$
Zone III: same as Zone II.
Zone IV: 3 columns or sections Pressure 128 bar Temperature 36° C. Bulk density of eluent 700 kg.m$^{-3}$
Mass flowrate of mixture to be separated: 1.8 kg/h constituted by 0.100 kg/h of the napthalene derivative mixture dissolved in 1.7 kg/h of pure carbon dioxide at 150 bar and 37° C.
Mass flowrate of additional eluent constituted by pure carbon dioxide at 253 bar and 36° C.: 3.3 kg/h
Mass flowrate for raffinate removal constituted by 0.050 kg/h of napthalene derivatives dissolved in 2.45 kg/h carbon dioxide: 2,5 kg/h
Mass flowrate for extract removal constituted by 0.050 kg/h of napthalene derivatives dissolved in 2,55 kg/h of carbon dioxide: 2.6 kg/h
Mass flowrate from compressor: 37.2 kg/h
Raffinate composition (after separation of $CO_2$): 94.5% 2-methylnapthalene
Extract composition (after separation of $CO_2$): 93.5% 1-methylnapthalene
The pressure drop over the twelve columns or sections was also negligeable, and in addition the mode can be considered to be isothermic
The displacement period was 10 minutes.

EXAMPLE 1c

Operational parameters and results obtained were as follows:
Eluting power modulation mode (supercritical eluent)
Zone I: 1 column or section Pressure 253 bar Temperature 40° C. Bulk density of eluent 900 kg.m$^{-3}$
Zone II: 5 columns or sections Pressure 164 bar Temperature 38° C. Bulk density of eluent 780 kg.m$^{-3}$
Zone III: 5 columns or sections Pressure 131 bar Temperature 36° C. Bulk density of eluent 710 kg.m$^{-3}$
Zone IV: 1 column or section Pressure 128 bar Temperature 36° C. Bulk density of eluent 700 kg.m$^{-3}$
Mass flowrate of mixture to be separated: 6 kg/h constituted by 0.100 kg/h of the napthalene derivative mixture dissolved in 5.9 kg/h of pure carbon dioxide at 135 bar and 40° C.
Mass flowrate of additional eluent constituted by pure carbon dioxide at 253 bar and 40° C.: 1.1 kg/h
Mass flowrate for raffinate removal constituted by 0.050 kg/h of napthalene derivatives dissolved in 5.05 kg/h carbon dioxide: 5.1 kg/h
Mass flowrate for extract removal constituted by 0,050 kg/h of napthalene derivatives dissolved in 2,55 kg/h of carbon dioxide: 2.6 kg/h
Mass flowrate from compressor: 35 kg/h
Raffinate composition (after separation of $C0_2$): 99.8% 2-methylnapthalene
Extract composition (after separation of $C0_2$): 99.7% 1-methylnapthalene
The pressure drop over the twelve columns or sections is very small, and in addition the mode can be considered to be isothermal.
The displacement period was 10 minutes.

Examples 1a, 1b and 1c used a supercritical eluent, that is with pressures and temperatures in the zones greater than or equal to the critical pressure and temperature. This has two known advantages:
firstly, solute/solvent separation is much easier than with a liquid or gas simply by reducing the pressure and/or, if necessary, the temperature. This conserves the purity of the extracts and raffinates which are extracted as solutes in the eluent and can be separated without the need for complex operations, particularly if the components are thermolabile;

secondly, when a liquid eluent is employed, even for a "real or simulated counter-current" process, the eluting or solvating power cannot be varied which implies that the mass flowrates in the different zones will differ greatly; however, under the conditions of the inventive process, the eluting or solvating power can be varied to avoid the need to radically alter the eluent mass flowrates in the different zones. This simplifies operations;

this allows the eluting power and the retention or elimination ability to be varied, and by successive elimination of the various components to increase in very surprising fashion the component concentrations in the extracts or raffinates (88 and 89%, example 1a; 94.5% and 93.5%, example 1b with graduated pressures; 99.8 and 99.7%, example 1c with graduated pressures and different numbers of columns or sections in different zones: 1-5-5-1). It appears that displacement, with an appropriate choice of columns or sections for each pressure level which itself is appropriately selected, combined with supercritical chromatographic techniques, produces very high yields. These selections can readily be made by the skilled person having at his disposal apparatus according to the invention and corresponding process data.

EXAMPLE 2

Separation of two isomers of dibromothiophene using a subcritical liquid. (equimolar mixture of 3,4-dibromothiophene and 2,5-dibromothiophene).

The equipment of the example above was used, with the same stationary phase and eluent, the inventive process being operated in modes where the carbon dioxide is a subcritical liquid firstly in the substantially constant pressure mode, and secondly in the eluting power modification mode.

EXAMPLE 2a

Operational parameters and results obtained are as follows:

Substantially constant pressure mode (81 bar), constant temperature (23° C.) and constant bulk density of subcritical liquid eluent (800 kg.m$^{-3}$)
Number of column or sections per zone: 3
Mass flowrate of mixture to be separated: 4.4 kg/h constituted by 0.200 kg/h of dibromothiophenes dissolved in 4.2 kg/h of carbon dioxide at 85 bar and 23° C.
Mass flowrate of additional eluent: 4 kg/h of pure carbon dioxide at 85 bar and 10° C.
Raffinate removal flowrate: 4.4 kg/h constituted by 0,100 kg/h of dibromothiophenes dissolved in 4.3 kg/h of carbon dioxide
Extract removal mass flowrate: 4.4 kg/h constituted by 0,100 kg/h of dibromothiophenes dissolved in 4.3 kg/h of carbon dioxide
Mass flowrate from compressor: 31 kg/h
Raffinate composition (after separation of $CO_2$): 90% of 2,5-dibromothiophene
Extract composition (after separation of $CO_2$): 88% of 3,4-dibromothiophene
The pressure drop in the 12 columns or sections was very low
The displacement period was 10 minutes.

EXAMPLE 2b

Operational parameters and results obtained were as follows:

Eluting power modulation mode (subcritical liquid eluent)
Zone I: 1 column or section Pressure 212 bar Temperature 30° C. Bulk density of eluent: 900 kg.m$^{-3}$
Zone II: 5 columns or sections Pressure 122 bar Temperature 26° C. Bulk density of eluent: 850 kg.m$^{-3}$
Zone III: 5 columns or sections Pressure 84 bar Temperature 28° C. Bulk density of eluent: 750 kg.m$^{-3}$
Zone IV: 1 column or section Pressure 75 bar Temperature 27° C. Bulk density of eluent 700 kg.m$^{-3}$
Mass flowrate of mixture to be separated: 9 kg/h constituted by 0,200 kg/h of the dibromothiophene mixture dissolved in 8.8 kg/h of pure carbon dioxide at 90 bar and 38° C.
Mass flowrate of additional eluent: 4.4 kg/h constituted by pure carbon dioxide at 220 bar and 0° C.
Mass flowrate for raffinate removal: 7.4 kg/h constituted by 0,100 kg/h of dibromothiophenes dissolved in 7.3 kg/h carbon dioxide
Mass flowrate for extract removal: 6 kg/h constituted by 0,100 kg/h of dibromothiophenes dissolved in 5.9 kg/h of carbon dioxide
Mass flowrate from compressor: 31 kg/h
Raffinate composition (after separation of $CO_2$): 99.9% of 2,5-dibromothiophene
Extract composition (after separation of $CO_2$): 99.8% of 3,4-dibromothiophene
Displacement period: 10 minutes; quasi isothermal mode.

Examples 2a and 2b were operated using a subcritical liquid eluent (pressure greater than critical pressure, temperature lower than critical temperature). Example 2a was operated at a practically constant pressure and produced yields of 88 and 90%; example 2b was operated with graduated pressures and pressure stages with a different number of columns or sections from zone to zone (1-5-5-1) and produced very high yields of 99.8 and 99.9%. It has thus been shown that by carefully selecting the parameters, the skilled person using the apparatus and data pertaining to the invention can produce high yields using simple means.

Pure carbon dioxide was used as eluent in these examples. It is possible to use carbon dioxide with added modifier (alcohol, ketone, hydrocarbon etc) or other eluents (nitrogen protoxide, chlorofluorocarbons, $C_2$ to $C_5$ alkanes and alkenes etc).

EXAMPLE 3

Separation of two isomers of pentane on molecular sieve 5A illustrating operation of the inventive process using a compressed gas.

Two current processes using the same adsorbent, molecular sieve 5A, exist in the prior art for separation of normal and isobutane:

A) The "PSA" process, which is essentially discontinuous and has the drawback of requiring a minimum of 3 (and at most generally 4) different adsorption reactors, of operating at high temperature (typically 300° to 400 ° C.) and of using greatly different pressure levels, for example 15 to 35 bar on adsorption and 0.5 to 3 bar absolute on desorption.

B) A simulated counter-current liquid phase process (trade name "Molex") using a mixture of normal and isobutane as desorbant.

The problem with the "Molex" process is the same as that for the "Parex" process for xylene separation which is, that it operates in the liquid phase: it has been shown for xylenes that operation in the vapour phase can be much more advantageous than operating in the liquid phase (see G. Storti, M. Mazzoti, L. T. Furlan, M. Morbidelli, S. Carra, Separ Sci and Tech, 27 (14), (1992) p 1889–1916). The main reason for this advantage is due to the respective bulk densities of the substances to be separated in the vapour, liquid and adsorbed phases: expressed as volume percentage of the separation column, the bed porosity represents about 35% while the microporous volume of the molecular sieve (the only separation means) represents 11 to 14%, easily three times less.

When operating in the liquid phase, the respective bulk densitys of adsorbed phase and liquid phase are roughly equivalent: separation on 1 g of adsorbed material is partially annulled by dilution with 3 g of non adsorbed material. When operating in the vapour phase, however, the respective bulk densities of adsorbed phase and vapour phase are in a ratio of 20 to 500 depending on the pressure. Thus for 1 g of adsorbed material, there is from 0.006 g to 0.15 g of non adsorbed material. This is not, however, suggested in the literature either by Storti et al (cited above) or by Raghuram et al (1992) (S. Raghuram, S. A. Wilcher, Separ Sci and Tech, 27 (14), p 1917–1954), which compares the respective advantages of PSA and the Molex process as an industrially realistic means of effecting a vapour phase simulated counter-current. In fact, Molex condenses and revapourises the recycling stream, while in the PSA process the temperature and compression are much too high for any commercially available compressor to be able to effect recycling between the low pressure and high pressure zones.

EXAMPLE 3a

Using the prior art (Molex process), separation of 50 t/h of a mixture of 20% by weight of n-pentane and 80 by weight of isopentane at 100° C. was attempted, using the liquid phase by means of an eluent mixture constituted by 85% by weight of n-butane and 15% by weight of isobutane.

In zone I the internal flowrate was 78 t/h, at the entrance to this zone 31 t/h of elution solvent was injected and 26.5 t/h of extract was collected at the exit.

The internal flowrate in zone II was 51.5 t/h.

The internal flowrate in zone III was 101.5 t/h; 50 t/h of batch was injected at the zone entrance and 54.5 t/h of raffinate was collected at the exit.

The internal flowrate in zone IV was 47 t/h, this flow being recycled to the entrance to zone I by a pump.

Six beds each of 4.7 m$^3$ were used and the permutation period was fixed at 1 minute 30 seconds. Two beds were in zone I, one bed in zone II, two beds in zone III and one bed in zone IV.

The total cycle time was 9 minutes.

EXAMPLE 3b

In accordance with the invention the same separation was attempted in the vapour phase at about 6 bar and 50° C., the batch, eluent and absorbant being identical to those of the preceding example.

In zone I the internal flowrate was 26 t/h; at the entrance to this zone 24.5 t/h of elution solvent was injected and 23.5 t/h of extract was collected at the exit.

The internal flowrate in zone II was 2.5 t/h.

The internal flowrate in zone III was 52.5 t/h; 50 t/h of batch was injected at the zone entrance and 51 t/h of raffinate was collected at the exit. The internal flowrate in zone IV was 1.5 t/h, this flow being recycled to the entrance to zone I by a compressor.

The compressibiltiy coefficient of the eluent under these conditions was 0.94.

Six beds each of 3.75 m$^3$ were used and the permutation period was fixed at 1 minute 30 seconds; two beds were in zone I, one bed in zone II, two beds in zone III and one bed in zone IV.

The total cycle time was 9 minutes.

EXAMPLE 3c

In accordance with the invention example 3b was repeated, removing zone IV for simplification purposes (see FIG. 3A).

The flowrates were as follows:
Zone I: 26 t/h, solvent 26 t/h, extract 23.5 t/h
Zone II: 2.5 t/h
Zone III: 52.5 t/h, batch 50 t/h, raffinate 52.5 t/h
Coefficient of compressibility of eluent: 0.94

Five beds each of 3.75 m$^3$ were used and the permutation period fixed at 1 minute 30 seconds. Two beds were in zone I, one bed in zone II, two beds in zone III; the total cycle time was 7 minutes 30 seconds.

Compared with the embodiment of example 3b, the installation was simplified and a saving of 17% of operating stock of sieve was made, at a cost of a slight overconsumption of solvent.

EXAMPLE 3d

In accordance with the invention the same separation as in examples 3a, 3b and 3c was attempted using gaseous ethane as desorbant.

In zone I the pressure and temperature were respectively 46 bar and 100° C., the internal flowrate was 31.5 t/h; at the entrance to this zone 24 t/h of solvent was injected and 23.5 t/h of extract was collected at the exit.

In zone II the pressure and temperature were respectively 46 bar and 100° C., the internal flowrate was 8 t/h.

The compressibility of ethane in zones I and II was 0.82.

In zone III the pressure and temperature were respectively 4.8 bar and 90° C., the internal flowrate was 58 t/h; 50 t/h of batch was injected at the zone entrance and 50.5 t/h of raffinate was collected at the entrance.

In zone IV, the pressure and temperature were respectively 4.8 bar and 90° C., the internal flowrate was 7.5 t/h.

The compressibiltiy coefficient of ethane under the conditions of zones III and IV was 0.98.

Six beds each of 5 m$^3$ were used and the permutation period was 2 minutes; two beds were in zone I, two beds in zone II, two beds in zone III and one bed in zone IV.

The total cycle time was 12 minutes.

Compared with example 3c, twice as much adsorbant and an equivalent quantity of eluent was used. The advantage of this operation rests in the subsequent separation of solvent from the extract and raffinate. In the first three cases distillation columns are used whilst in the fourth case, a series of two "flash" release valves are used for the extract and for the raffinate a single "flash"

release valve is used. A particular feature of this embodiment is that recycling from zone IV to zone I does not occur at a constant flowrate at the exit to zone IV since there is a depressurisation of the column in this zone from 46 to 4.8 bar. Similarly, the second of the two columns in zone II does not have a constant flowrate at its entrance as here there is a repressurisation from 4.8 bar to 46 bar.

Purity and yield of isopentane are equivalent for all four examples 3a, 3b, 3c, 3d: isopentane purity in the raffinate of greater than 98%, yield of isopentane in the raffinate greater than 98%.

The apparatus and process of the present invention thus produce surprising yields and purities using eluents at pressures greater than or equal to the critical pressure and at temperatures greater than or equal to (supercritical fluid) or lower than (subcritical liquid) the critical temperature, also using compressed gaseous eluents at pressures below the critical pressure and having a compressibiltiy coefficient substantially different to 1, the temperature being either greater than or less than the critical temperature.

EXAMPLE 4

The mixture for fractionation was constituted by 1-methylnapthalene (33% by weight), 2-methylnapthalene (33% by weight) and heavier compounds assimilable with isomers of trimethylnapthalene (33% by weight).

The apparatus (FIG. 2) comprised fifteen chromatographic columns or sections of 30 cm length and 6 cm diameter filled with a stationary phase constituted by octadecyl grafted silica (RP 18) of an average diameter of the order of 35 micrometers connected in series with the valve system and compressor described above.

The eluent was pure carbon dioxide. No heat exchanger was employed in series between the columns. Several functional modes were used in accordance with the invention using the dual pressure state mode described in French patent FR-A-2 651 149 (zone O and zones I, II, III and IV) and using the pressure modulation mode described in the present invention.

EXAMPLE 4a (comparative)

Operational parameters and results obtained were as follows:
  Two solvent state mode ("strong" and "weak" solvents within the meaning of FR-A-2 651 149)
  Number of columns or sections per zone: 3
  Mode: quasi-isothermic at about 40° C.
  Displacement period: 10 minutes
  Pressure in zone O (strong solvent): 253 bar bulk density of eluent: 900 kg.m$^{-3}$
  Pressure in zones I, II, III and IV (weak solvent): 146 bar bulk density of eluent: 750 kg.m$^{-3}$
  flowrates and compositions of entrances/exits:

| Stream | Added eluent E1 | IR1 | IA + B + C | SA | SB | SC |
| --- | --- | --- | --- | --- | --- | --- |
| Mass flowrate kg/h | 5 | 39.0 | 1.6 | 2.0 | 2.40 | 2.20 |
| CO2 kg/h | 5 | 39.0 | 1.45 | 1.96 | 2.34 | 2.15 |
| Product flowrate kg/h | 0 | 0 | 0.15 | 0.041 | 0.060 | 0.049 |
| Composition % mass | | | | | | |
| 2-methyl-napthalene | — | — | 33 | 92.2 | 16.0 | 5.3 |
| 1-methyl-napthalene | — | — | 33 | 6.8 | 68.9 | 11.7 |
| trimethyl-napthalenes | — | — | 33 | 1.0 | 15.1 | 83.0 |

EXAMPLE 4b

Pressure modulation mode in accordance with the invention
Quasi-isothermal mode at about 40° C.
Displacement period: 8 minutes
Zone characteristics:
  Zone 0:3 columns at pressure 212 bar: bulk density of solvent: 850 kg.m$^{-3}$
  Zone I: 3 columns; pressure 146 bar; bulk density of solvent: 780 kg.m$^{-3}$
  Zone II: 3 columns; pressure 146 bar; bulk density of solvent: 750 kg.m$^{-3}$
  Zone III: 3 columns; pressure 131 bar; bulk density of solvent: 710 kg.m$^{-3}$
  Zone IV: 3 columns; pressure 128 bar; bulk density of solvent: 700 kg.m$^{-3}$
Flowrates and compositions at entrances/exits:

| Stream | Added eluent E1 | IR1 | IA + B + C | SA | SB | SC |
| --- | --- | --- | --- | --- | --- | --- |
| Mass flowrate kg/h | 2 | 39.0 | 2.2 | 1.2 | 0.5 | 2.5 |
| CO2 kg/h | 2 | 39.0 | 2.05 | 1.15 | 0.46 | 2.454 |
| Product flowrate kg/h | — | — | 0.15 | 0.050 | 0.054 | 0.045 |
| Composition % mass | | | | | | |
| 2-methyl-napthalene | — | — | 33 | 98.5 | 1.6 | 1.4 |
| 1-methyl-napthalene | — | — | 33 | 1.1 | 92.7 | 1.5 |
| trimethyl-napthalenes | — | — | 33 | 0.4 | 5.7 | 97.1 |

The performance was substantially superior in the pressure modulation mode compared with that of the other example (4a).

EXAMPLE 5

Fractionation of a mixture of bromothiophenes

The mixture to be fractionated was constituted by 2,5-bromothiophene (33% by weight), 3,4-dibromothiophene (33% by weight) and 2,3,4,5-tetrabromothiophene (33% by weight).

The apparatus used was identical to that used in the preceding example and in example 1 (FIG. 3).

The eluent used was trifluorobromoethane (CF$_3$Br) whose critical coordinates are 39.7 bar and 67° C. The apparatus was used in several functional modes in accordance with the invention, namely substantially constant pressure mode wherein the pressure in the five zones was about 70 bar, (temperature 80° C.), and pressure modulation mode as described in the present application.

In the examples below, the zones comprised the following number of columns: zone O—one; zone I—three; zone II—five; zone III—five; zone IV—one. The displacement period is fixed at 3.3 minutes in all cases.

EXAMPLE 5a

Operational parameters and results obtained were as follows:

Substantially constant pressure mode (70 bar), constant temperature (80° C.), constant bulk density of eluent constant (1050 kg.m$^{-3}$)

The pressure drop across the columns or sections is low and the mode may be considered to be isothermal flowrates and concentrations at entrance/exits:

| Stream | Added eluent E1 | IR1 | IA + B + C | SA | SB | SC |
|---|---|---|---|---|---|---|
| Mass flowrate kg/h | 73 | 120 | 14 | 15 | 15 | 57 |
| CF3Br kg/h | 73 | 120 | 13 | 17.67 | 14.6 | 56.73 |
| Product flowrate kg/h | 0 | 0 | 1 | 0.33 | 0.40 | 0.27 |
| Composition % mass | | | | | | |
| 2,5-dibromo-thiophene | — | — | 33 | 93 | 3.3 | 5.9 |
| 3,4-dibromo-thiophene | — | — | 33 | 2.3 | 80 | 3.1 |
| 2,3,4,5-tetra-bromothiophene | — | — | 33 | 4.7 | 16.7 | 91.0 |

EXAMPLE 5b

Operational parameters and results obtained were as follows:

Eluent pressure modulation mode, isothermal at 80° C.

Zone O: pressure 100 bar; bulk density of eluent: 1280 kg.m$^{-3}$

Zone I: pressure 81 bar; bulk density of eluent: 1150 kg.m$^{-3}$

Zone II: pressure 76 bar; bulk density of eluent: 1100 kg.m$^{-3}$

Zone III: pressure 68 bar; bulk density of eluent: 950 kg.m$^{-3}$

Zone IV: pressure 94 bar; bulk density of eluent: 900 kg.m$^{-3}$.

flowrates and compositions at entrance/exits:

| Stream | Added eluent E1 | IR1 | IA + B + C | SA | SB | SC |
|---|---|---|---|---|---|---|
| Mass flowrate kg/h | 73 | 120 | 14 | 15 | 15 | 57 |
| CF3Br kg/h | 73 | 120 | 13 | 14.67 | 14.6 | 56.73 |
| Product flowrate kg/h | 0 | 0 | 1 | 0.33 | 0.40 | 0.27 |
| Composition % mass | | | | | | |
| 2,5-dibromo-thiophene | — | — | 33 | 99.9 | 0.1 | 0.1 |
| 3,4-dibromo-thiophene | — | — | 33 | — | 83.8 | — |
| 2,3,4,5-tetra-bromothiophene | — | — | 33 | 0.1 | 16.1 | 99.9 |

It can be seen that the pressure modulation mode produced much purer fractions than those from the other mode for the same solvent flowrate and batch flowrate.

In addition, the experiment showed that when operating with an apparatus such as that described for FIG. 3B, the quantitative and qualitative results were very close to those obtained with the apparatus of FIG. 1.

However, in this case (operation of apparatus of FIGS. 3A and 3B), the apparatus and operation thereof was considerably simplified.

In order to illustrate the apparatus according to the invention in more detail it is necessary to refer to FIG. 5 which schematically represents the construction of two zones, columns or sections of columns $C_k$ and $C_{k+1}$.

Elements of FIG. 2 will also be referred to.

Two valves are located between each pair of zones, sections or columns $C_k$ and $C_{k+1}$, one for free passage/total closure (on-off) denominated $V_k$ and one regulable valve, $U_k$, for reducing or releasing the pressure. In addition, two free passage/total closure (on-off) valves $V'_k$ and $V''_k$ are connected to takeoff lines SR and delivery lines IR of compressor K (or a pump). With this simple system the pressure can be altered in all the columns of the apparatus, and in particular the different zones described above can be displaced to carry out the process of the invention.

The following elements are added to this apparatus particularly to allow a portion of the eluent (between zone O and I of FIG. 2 for example) to be added by using, in the apparatus shown in FIG. 5, open/total close (on-off) valves V''' and regulable valve U; said valve U depressurises the fluid to that at the entrance to zone I (line IR2) and can advantageously be manipulated by regulating the flowrate in this part of the circuit. Said valves V''' are manipulated in the same way as valves $V'_k$. If the operator does not wish to recycle between zones (O and I, FIGS. 1 and 4), valves U and all valves V''' can be closed at the same time, all the fluid eluent then being distributed by line IR1.

Regarding the embodiment including pump P and separator S, the pump can be fed by condensing the solvent in a heat exchanger and storing it in an intermediate reservoir to permit more regular pumping; the compressed fluid issuing from the pump is then brought to the working temperature using a heat exchanger. The system is conventionally used in removal/fractionation using a supercritical fluid and is not shown in the figures.

We claim:

1. An apparatus for fractionating a mixture of p components into p components or q cuts, q being less than or equal to p, the apparatus comprising an assembly of n chromatographic columns or column sections mounted in series in a closed loop, having at least r injection streams and at most n injection points per injection stream and having q removal streams and at most n removal points per removal stream, the injection and removal streams being alternated along the series of columns or sections, r, n, p and q being whole numbers defined as follows:

p: represents the number of components present in the batch, $p \geq 2$;

q: represents the number of distinct cuts or effluents issuing from the process, $q \geq 2$;

n: represents the number of distinct columns or column sections used: $n \geq 3$;

r: represents the number of distinct injection streams in the apparatus, and $5 \geq r \geq 2$;

the closed loop being formed of m successive chromatographic zones, optionally including at least one of the following sequences I, II, III; I, II, III, IV; O, I, II, III, IV; I, Z, II, III, IV; I, II, III, Z, IV, each of these zones being constituted by at least one column or section ($C_k$);

m: represents the number of zones: $3 \leq m \leq q+r$, at least one and at most two points ($IR_1$, $IR_2$) between two zones serving for injection of eluent (recycled, fresh or recycled plus additional fresh), at least one point between two zones (IA+B or IA+B+C) serving for injection of the mixture to be fractionated, at least one raffinate removal point (SA) between each mixture injection point and the following eluent injection point situated downstream of the mixture injection point, with respect to the eluent circulation direction, at least one extract removal point (SB, SC) between each eluent injection point and the mixture injection point situated downstream with respect to the eluent circulation direction, a removal point (SR) for a recycling stream connected to zone IV when said zone IV is present or connected to a separator S when said zone IV is not present, a control apparatus for periodically displacing the injection points ($IR_1$, $IR_2$, IA+B or IA+B+C) and the removal points (SC, SB, SA, SR) of at least one section or column in the same direction wherein the apparatus comprises a compressor or pump whose takeoff is connected to the recycling stream removal point (SR) and optionally to an addition point for fresh eluent and whose delivery is connected to at least one recycling stream injection point ($IR_1$ or $IR_2$) upstream of the furthest upstream extract removal point (SC, SB), the compressor or pump being adapted to deliver to said recycling stream injection point either a compressed gas whose pressure is lower than the critical pressure of said gas and which has a compressibility coefficient substantially different to 1, or a supercritical fluid, or a subcritical liquid.

2. Apparatus according to claim 1 comprising three zones (I, II, III), four zones (I, II, III, IV) or five zones (I, Z, II, III, IV or I, II, III, Z, IV) for separation of two components or two cuts, wherein at least one pressure reduction or release means is provided to vary the pressure between one zone (or column or section) and the zone, column or section immediately downstream, said pressure reduction means being connected to said control means for periodic displacement.

3. Apparatus according to claim 1 comprising three successive zones I, II, III for separation of two components or two cuts, wherein zone III (upstream of which mixture A+B is injected) is immediately followed by a release and separation means for the eluent and raffinate, the release and separation means comprising the raffinate removal point and the removal point for eluent recycling (SR) which is connected to the compressor or pump, allowing zone IV to be removed.

4. Apparatus according to claim 1 wherein a zone Z is interposed between zones I and II and is defined upstream by the extract removal point (SB) and downstream by a reinjection point (IRB) for a portion of the substantially eluent free extract.

5. Apparatus according to claim 1 wherein a zone Z is inserted downstream of zone III and is defined upstream by a reinjection point (IRA) for a substantially eluent free raffinate portion and downstream by the raffinate removal point (SA).

6. Apparatus according to claim I comprising four zones (O, I, II, III) or five zones (O, I, II, III and IV) for separation of three components or three cuts wherein at least one pressure reduction or release means is situated between two removal points other than the extract removal point, said pressure reduction means being connected to said means for controlling periodic displacement.

7. Apparatus according to claim 1 wherein at least one additional pressure reduction or release means connected to the means for controlling periodic displacement is located between zone O and zone I.

8. Apparatus according to claim 1 comprising four successive zone O, I, II, III for separation of three components A, B, C or three cuts, wherein zone III (downstream of the injection point for the mixture A+B+C) is immediately followed by a raffinate (eluent and constituent A) release and separation means, said release and separation means comprising the raffinate removal point (SA) and the removal point for eluent recycling (SR) which is connected to a compressor or the pump, thus allowing zone 1V to be removed.

9. An apparatus according to claim 1, wherein $q \leq 5$.

10. An apparatus according to claim 1, wherein $n \leq 24$.

11. An apparatus according to claim 1, wherein $q \geq r \geq 2$.

12. An apparatus according to claim 1, wherein the injection points and the removal points are periodically displaced in the same upstream direction.

13. An apparatus according to claim 1, wherein the injection points and the removal points are periodically displaced in the same downstream direction.

14. An apparatus according to claim 1, wherein said compressor or pump takeoff is also connected to said addition point.

15. An apparatus for fractionating a mixture of p components into p components or q cuts, q being less than or equal to p, using an apparatus comprising an assembly of n chromatographic columns or column sections mounted in series in a closed loop, having at least r injection streams and at most n injection points per injection stream and having q removal streams and at most n removal points per removal stream, the injection and removal streams being alternated along the series of columns or sections, r, n, p and q being whole numbers defined as follows:

p: represents the number of components present in the batch, $p \geq 2$;

q: represents the number of distinct cuts or effluents issuing from the process, $q \geq 2$;

n: represents the number of distinct columns or column sections used: $n \geq 3$;

r: represents the number of distinct injection streams in the apparatus, and $5 \geq r \geq 2$;

the closed loop being formed of m successive chromatographic zones, optionally including at least one of the following sequences I, II, III; I, II, III, IV; O, I, II, III, IV; I, Z, II, III, IV; I, II, III, Z, IV, each of these zones being constituted by at least one column or section ($C_k$);

m: represents the number of zones: $3 \leq m \leq q+r$, at least one and at most two points ($IR_1$, $IR_2$) between two zones serving for injection of eluent (recycled, fresh or recycled plus additional fresh), at least one point between two zones (IA+B or IA+B+C) serving for injection of the mixture to be fractionated, at least one raffinate removal point (SA) between each mixture injection point and the following eluent injection point situated downstream of the mixture injection point, with respect to the eluent circulation direction, at least one extract removal point (SB, SC) between each eluent injection point and the mixture injection point situated downstream with respect to the eluent circulation direction, a removal point (SR) for a recycling stream connected to zone IV when said zone IV is present or connected to a separator S when said zone IV is not present, wherein the injection points (IR$_1$, IR$_2$, IA+B or IA+B+C) and the removal points (SC, SB, SA, SR) of at least one section or column are periodically displaced in the same direction wherein:

either a compressed gas is injected as eluent wherein the pressure at any point in all zones is lower than the critical pressure of the gas and in that the gas has a compressibility coefficient substantially different to 1, over any point in at least one zone;

or at least one supercritical fluid is injected as eluent;

or at least one subcritical fluid is injected as eluent.

16. Process in accordance with claim 15 wherein the eluent fluid is injected into the closed loop at a temperature other than the operating temperature.

17. Process according to claims 15 wherein, to separate a mixture of two components or two cuts, the pressure in one column (or zone) is maintained at a level which is higher than or equal to that in the column (or zone) immediately downstream except at each eluent injection point where the pressure increases to the injection pressure.

18. A process according to claim 17, wherein the pressure is decreased by at least one interval between two removal points following injection upstream of eluent (IR1) to the recycling removal point (SR).

19. Process according to claim 15 wherein, to separate a mixture of three components or three cuts, the pressure is decreased by at least one interval between two removal points other than the extract removal point between zone O and I.

20. Process according to claim 19 wherein the pressure is also decreased between zone O and zone I.

21. Process according to claim 15 wherein a mixture of three components is injected into an apparatus having four zones (O, I, II, III), wherein all the eluent and raffinate is released and separated downstream of zone III upstream of which the batch (A+B+C) has been introduced; the raffinate is collected and the eluent recycling stream is recycled at the injection pressure.

22. Process according to claim 15, wherein a mixture of two components is injected into an apparatus comprising three zones (I, II, III) wherein all the eluent and raffinate is released and separated downstream of zone III where mixture (AB) has been injected, the raffinate is collected and the eluent recycling stream is recycled at the injection pressure.

23. Process according to claim 15, wherein a portion of the substantially eluent free extract is introduced downstream of a zone Z between zone I and zone II, defined upstream by the extract removal point (SB) and downstream by a reinjection point (IRB) for said portion of the substantially eluent free extract.

24. Process according to claim 15, wherein a portion of the substantially eluent free raffinate is introduced upstream of a zone Z located downstream of zone III and defined upstream by a reinjection point (IRA) for said substantially eluent free raffinate portion and downstream by the raffinate removal point (SA).

25. Process according claim 15, wherein the pressure in zone III is lower by at least one bar than the pressure in zone II.

26. A process according to claim 15, wherein $q \leq 5$.

27. A process according to claim 15, wherein $n \leq 24$.

28. A process according to claim 15, wherein $q \geq r \geq 2$.

29. A process according to claim 15, wherein the injection points and the removal points are periodically displaced in the same upstream direction.

30. A process according to claim 15, wherein the injection points and the removal points are periodically displaced in the same downstream direction.

31. A process according to claim 15, wherein a compressed gas is injected as eluent wherein the pressure at any point in all zones is lower than the critical pressure of the gas and in that the gas has a compressibility coefficient substantially different to 1 over any point in at least two zones from the eluent injection point.

32. A process according to claim 25, wherein the pressure in zone III is lower by 3 to 100 bar than the pressure in zone II.

* * * * *